United States Patent
Lee

(10) Patent No.: US 6,837,602 B1
(45) Date of Patent: Jan. 4, 2005

(54) COVER FOR A SHELL OF A TAIL-LIGHT OF A VEHICLE

(75) Inventor: Jihn-Shiun Lee, Tainan (TW)

(73) Assignee: Fu An Industrial Co., Ltd., Tainan (TW)

( * ) Notice: Subject to any disclaimer, the term of this patent is extended or adjusted under 35 U.S.C. 154(b) by 0 days.

(21) Appl. No.: 10/667,348

(22) Filed: Sep. 23, 2003

(51) Int. Cl.$^7$ .................................................. F21V 5/00
(52) U.S. Cl. ........................ 362/520; 362/544; 362/545; 362/540; 362/330; 362/332
(58) Field of Search .................................. 362/510, 520, 362/540–545, 326, 330, 332

(56) References Cited

U.S. PATENT DOCUMENTS

| | | | |
|---|---|---|---|
| 4,635,170 A | * | 1/1987 | Beiswenger ................. 362/157 |
| 6,019,493 A | * | 2/2000 | Kuo et al. ................... 362/335 |
| 6,406,171 B1 | * | 6/2002 | Satsukawa et al. ......... 362/518 |
| 6,654,172 B2 | * | 11/2003 | Pond et al. .................. 359/619 |

FOREIGN PATENT DOCUMENTS

DE 20315175 U * 1/2004

* cited by examiner

*Primary Examiner*—Laura K. Tso
(74) *Attorney, Agent, or Firm*—Rosenberg, Klein & Lee

(57) ABSTRACT

A cover for a shell of a vehicle tail-light has a disk portion, and separating plates secured to an inward side of the disk portion; the disk portion is formed with such a surface as to be capable of focusing light; the cover is disposed over a rear opening of the tail-light shell with the separating plates being in close contact with the inner side of the shell such that the disk portion is divided into four sector shaped areas, an X shaped area, and a ringed area by the separating plates as well as the shell; the tail-light has light emitting element sets, which oppose respective ones of the above areas, and can be separately powered. Therefore, the tail-light can function with selected ones of the light emitting element sets being activated.

4 Claims, 10 Drawing Sheets

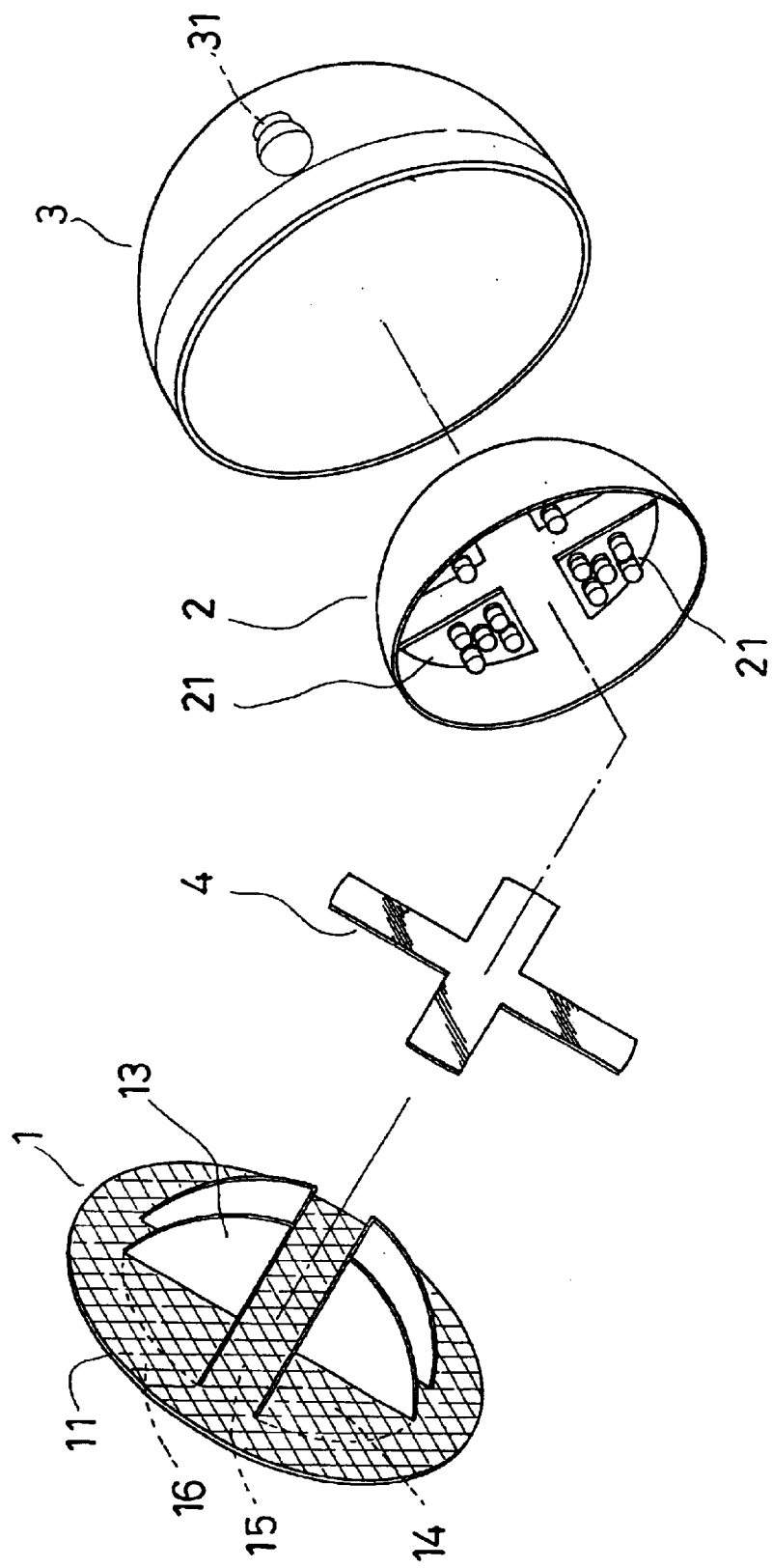

COVER FOR A SHELL OF A TAIL-LIGHT OF A VEHICLE

BACKGROUND OF THE INVENTION

1. Field of the Invention

The present invention relates to a cover for a shell of a vehicle tail-light, more particularly one, which can be connected with various different shells and light emitting mechanisms of vehicle tail-light for providing various different vehicle tail-light structures.

2. Brief Description of the Prior Art

Diversity is a character of merchandises in the market of today. Consumers have much more choices than before in shopping owing to the increasing diversity of merchandises.

Conventional tail-lights of vehicles usually have rectangular or circular covers, which are formed with protrusions and recesses on the inward sides for focusing light. However, vehicle tail-light covers of such kind can't satisfy the consumer's demand for variety any longer.

SUMMARY OF THE INVENTION

It is a main object of the present invention to provide a cover for a shell of a tail-light of a vehicle, more particularly one, which can be used together with certain different forms of shells and light emitting mechanisms of vehicle tail-light so that a vehicle tail-light can have different functions integrated together.

The cover for a shell of a tail-light of a vehicle in the present invention has a disk portion, and separating plates secured to an inward side of the disk portion. The disk portion is formed with such a surface as to be capable of focusing light. The cover is disposed over the front opening of the shell of a tail-light with the separating boards being in close contact with the inner side of the shell such that the disk portion is divided into four sector shaped areas, an X shaped area, and a ringed area by the separating plates and the shell. The tail-light has light emitting element sets, which oppose respective ones of the above areas, and can be separately powered. Therefore, the tail-light can function as a turning indicator, a fog light, a back-up light, a rear sidelight, and a brake light when appropriate ones of the light emitting element sets emit light.

BRIEF DESCRIPTION OF THE DRAWINGS

This invention will be better understood by referring to the accompanying drawings, wherein:

FIG. 9 is an exploded perspective view of a second embodiment of a tail-light of a vehicle.

DETAILED DESCRIPTION OF THE PREFERRED EMBODIMENTS

Figure 1:
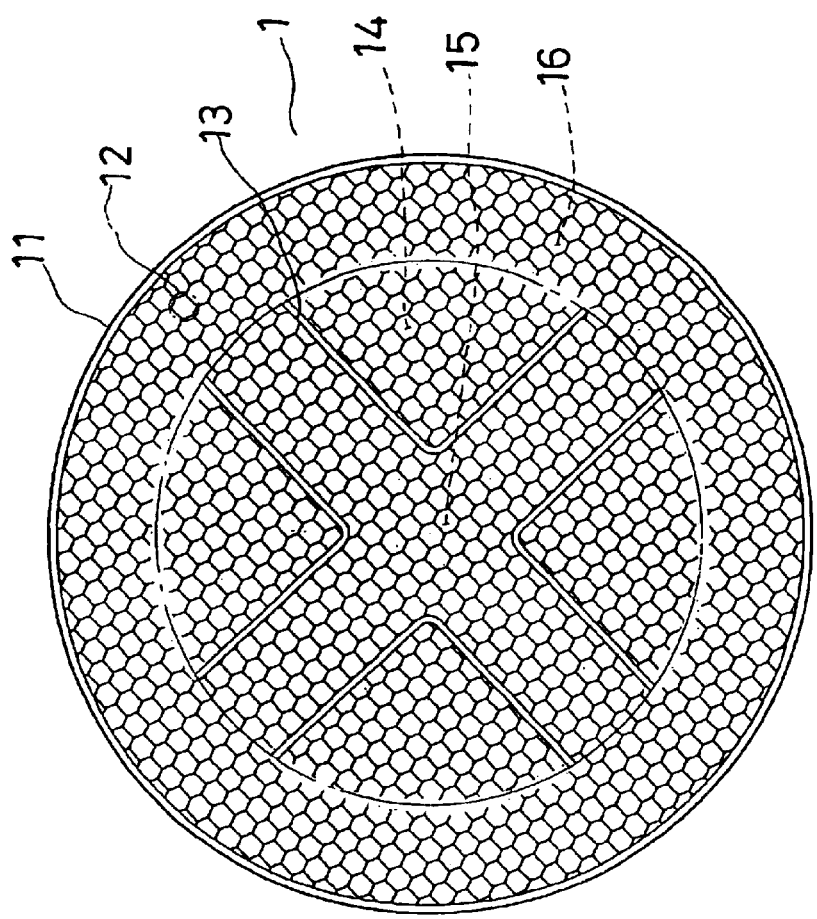
FIG. 1 is a rear view of the cover for a shell of a tail-light of a vehicle according to the present invention.
Figure 2:
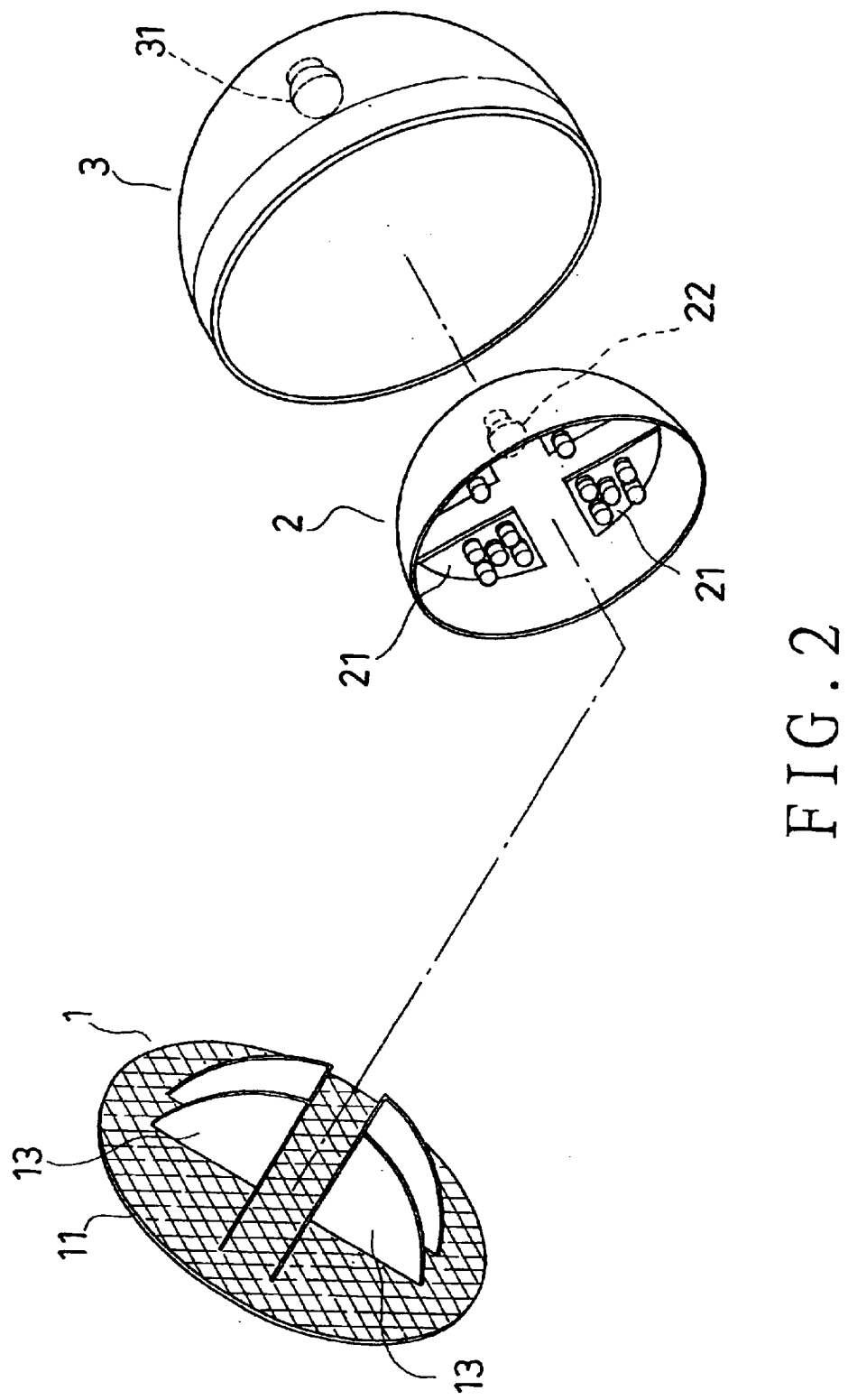
FIG. 2 is an exploded perspective view of a first embodiment of a tail-light of a vehicle.
Figure 3:
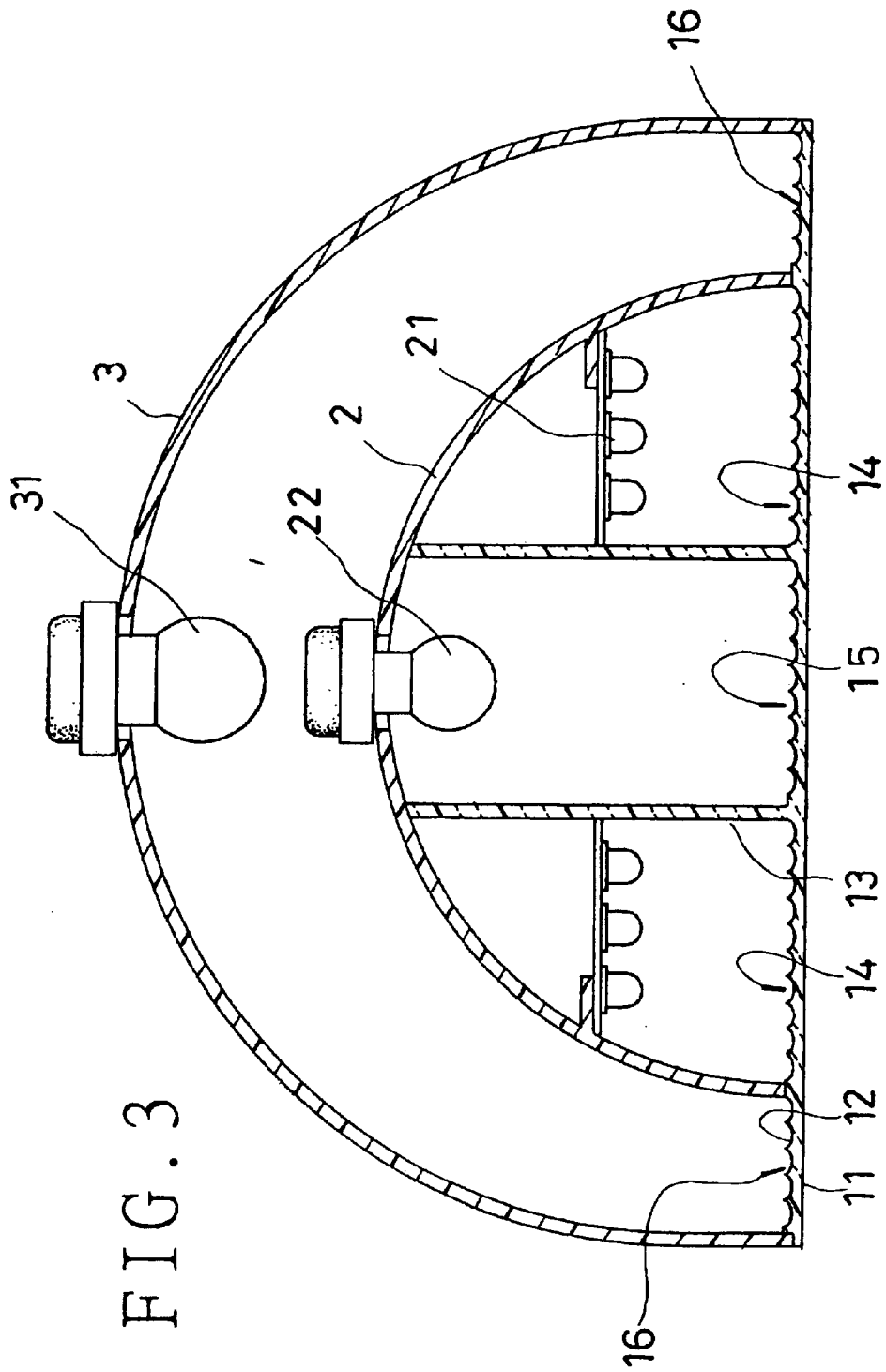
FIG. 3 is a cross-sectional view of the first embodiment of a tail-light.

Referring to FIG. 1, a first embodiment of a tail-light of a vehicle in the present invention includes a cover 1, an inner shade 2, first and second light sources 22, 31, four light emitting element sets 21, and a shell 3.

The inner shade 2 has a circular opening at a rear end. The first light source 22 is disposed on a middle portion of the inner shade 2 to face the rear opening of the shade 2. The light emitting element sets 21 can be comprised of LED (light emitting diodes), and are disposed in respective quarters of an inner room of the inner shade 2 such that an X shaped space is defined in between.

The shell 3 is bigger than the inner shade 2, and has a circular opening at a rear end. The light source 31 is disposed on a middle portion of the shell 3 to face the rear opening of the shell 3. The shell 3 is disposed over the inner shade 2.

The cover 1 is comprised of a disk portion 11, and four separating lates 13 secured to an inner side of the disk portion 11. The disk portion 1 is formed with concavely curved portions 12 all over the inner surfaces so that light can be focused when traveling through the cover 1. The separating plates 13 are folded so as to have right angles, and located at respective quarters of the disk portion 11 such that an X shaped space is defined in between, and such that all of the outward ends thereof are situated on a same imaginary circle, which is smaller than the edge of the disk portion 11. The cover 1 is disposed over the rear opening of the inner shade 2 such that the inner surface of the inner shade 2 is closely in contact with the separating plates 13, and the rear edge of the inner shade 2 is over the imaginary circle around the outward ends of the separating plates 13, and such that the X shaped spaces of the cover 1 and the inner shade 2 oppose each other in the same orientation. And, the cover 1 is disposed over the rear opening of the shell 3, and connected with the rear end of the shell 3 at the edge thereof. Therefore, the disk portion 11 of the cover 1 is divided into four sector shaped areas 14 of the same size, an X shaped area 15, and a ringed area 16, as shown in FIG. 1.

Figure 4:
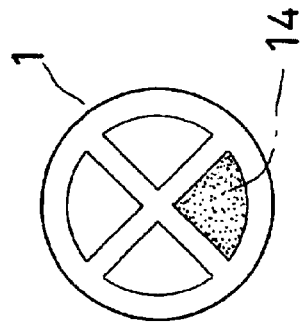
FIG. 4 is a rear view of the first and the third embodiments of a vehicle tail-light, functioning as a turning indicator.
Figure 5:
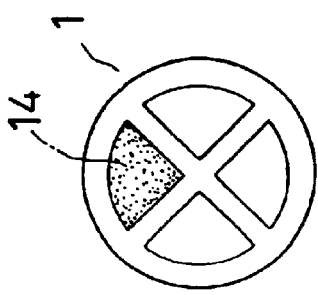
FIG. 5 is a rear view of the first and the third embodiments of a vehicle tail-light, functioning as a fog light.
Figure 6:
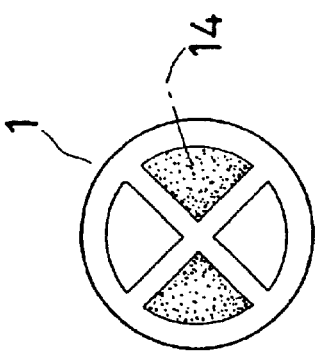
FIG. 6 is a rear view of the first and the third embodiments of a vehicle tail-light, functioning as a back-up light.
Figure 7:
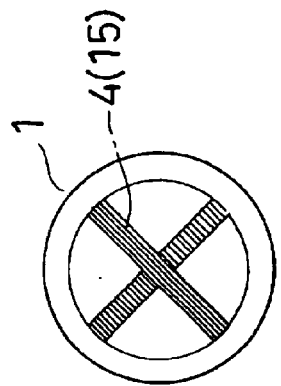
FIG. 7 is a rear view of the first and the third embodiments of a vehicle tail-light, functioning as a rear sidelight.
Figure 8:
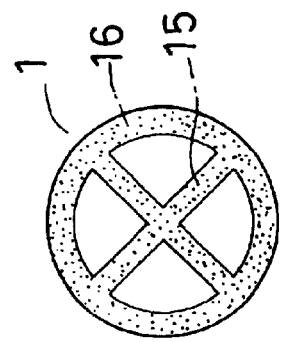
FIG. 8 is a rear view of the first and the third embodiments of a vehicle tail-light, functioning as a brake light.

Referring to FIGS. 4 to 8, which are rear views of the present vehicle tail-light, the tail-light can function as a turning indicator when left and right ones of the light emitting element sets 21 emit light, as shown in FIG. 4; the tail-light can function as a fog light when an uppermost one of the light emitting element sets 21 emit light, as shown in FIG. 5; the tail-light can function as a back-up light when a lowermost one of the light emitting element sets 21 emit light, as shown in FIG. 6; the tail-light can function as a rear sidelight when the second light source 31 emits light, as shown in FIG. 7; the tail-light can function as a brake light when the first and the second light sources 22 and 31 emit light, as shown in FIG. 8.

Figure 11:
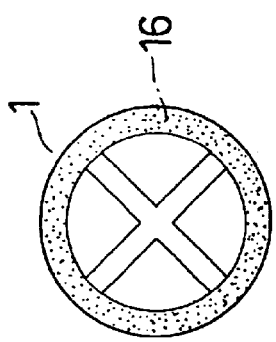
FIG. 11 is a rear view of the second and the fourth embodiments of a vehicle tail-light, functioning as a reflector.
Figure 10:
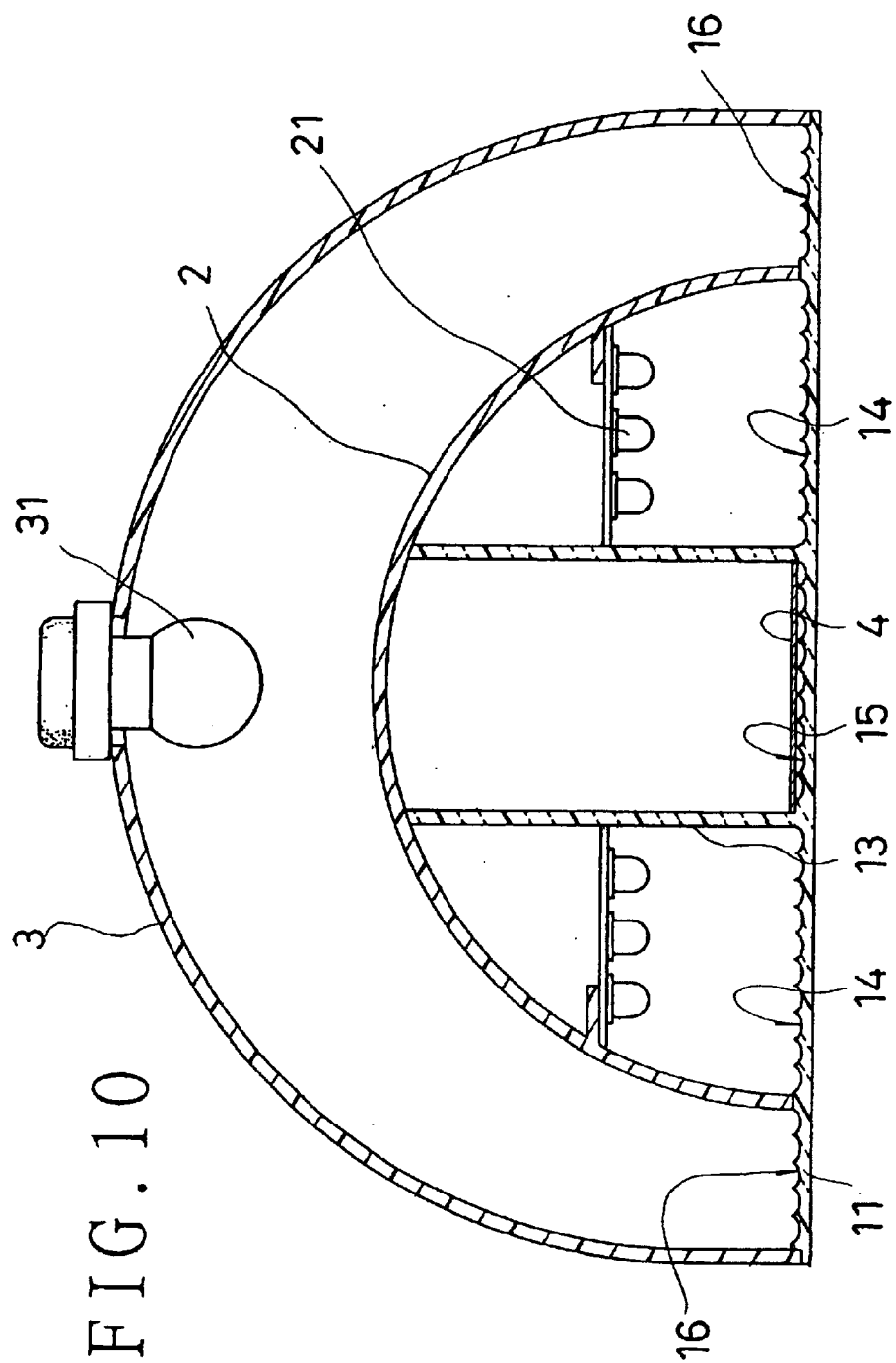
FIG. 10 is a cross-sectional view of the second embodiment of a tail-light of a vehicle.

Referring to FIGS. 9, and 10, in a second embodiment of a tail-light of a vehicle, shell 3 and inner shade 2 are connected with cover 1 in the same way as the first embodiment while the cover 1 has an X shaped reflector 4 adhering to X shaped area 15 of disk portion 11 thereof. Thus, the second embodiment not only can be used as turning indicator (FIG. 4), fog light (FIG. 5), back-up light (FIG. 6), and rear sidelight (FIG. 7) in the same way as described above but also can function as a reflector when light from outside or other vehicles is shining on the cover 1, as shown in FIG. 11.

Figure 12:
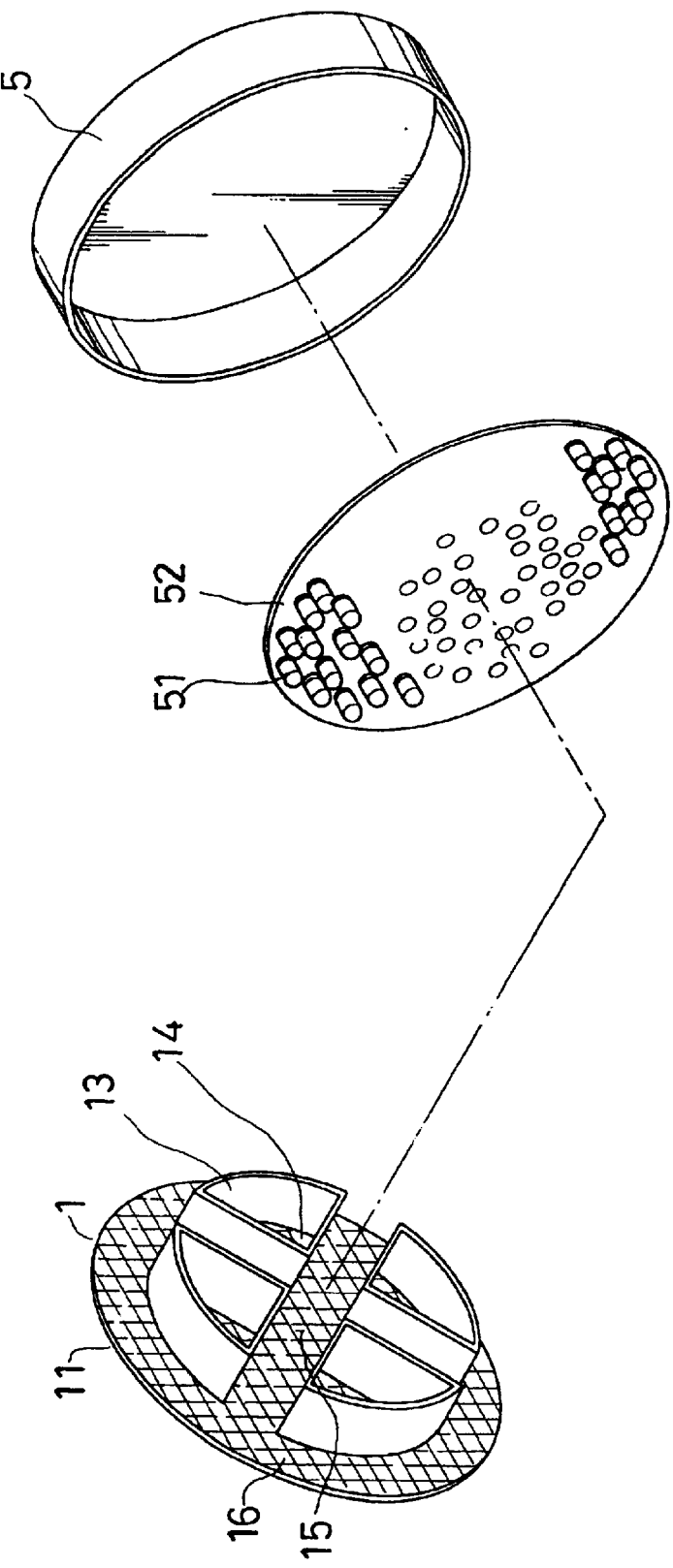
FIG. 12 is an exploded perspective view of the third embodiment of a tail-light of a vehicle.
Figure 13:
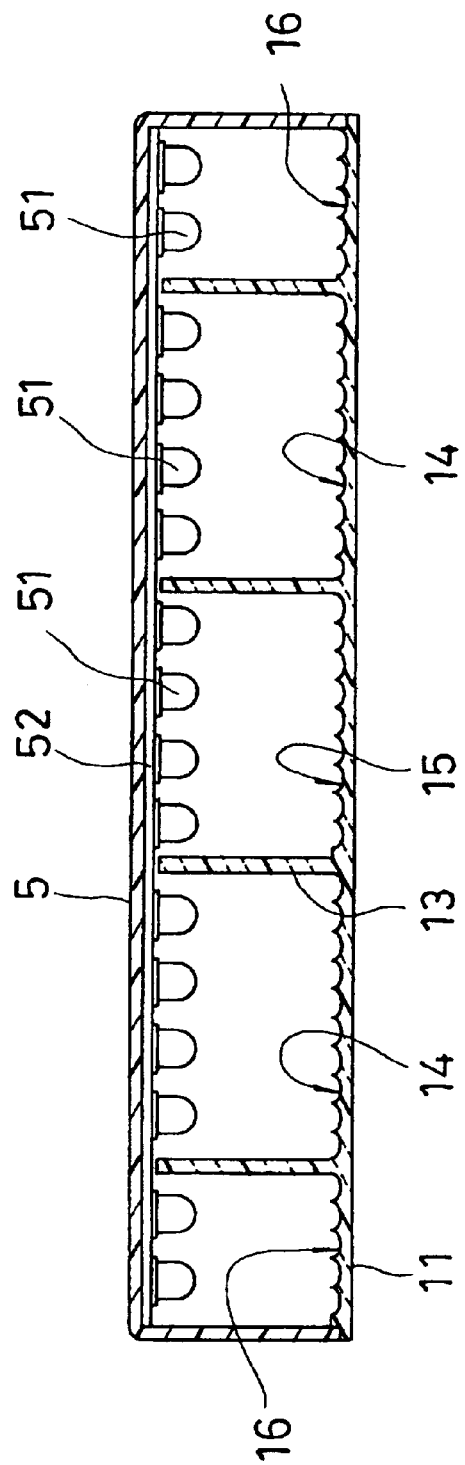
FIG. 13 is a cross-sectional view of the third embodiment of a tail-light.

Referring to FIGS. 12, and 13, a third embodiment of a tail-light of a vehicle is comprised of cover 1, light emitting diodes 51, a circuit board 52, and a shell 5. The cover 1 has a disk portion 11, and separating plates 13, which are secured to respective quarters of an inward surface of the disk portion 11, and which divide the inward surface of the disk portion 11 into four sector shaped areas 14 of the same size, an X shaped area 15, and a ringed area 16. The circuit board 52 is substantially as big as the disk portion 11. The light emitting diodes 51 are arranged all over, and connected with, the circuit board 51. The circuit boards 52 and the separating boards 13 are disposed in the shell 5, and the disk portion 11 is secured to the edge of the shell 5 so that the light emitting diodes 51 oppose respective areas 14, 15, and 16 of the disk portion 11. Thus, the tail light can function as a turning indicator when those of the light emitting diodes 51 emit light that oppose left and right ones of the sector shaped areas 14 as shown in FIG. 4, as a fog light when those of the light emitting diodes 51 emit light that oppose an uppermost one of the sector shaped areas 14 as shown in FIG. 5, as a back-up light when those of the light emitting diodes 51 emit light that oppose a lowermost one of the sector shaped areas 14 as shown in FIG. 6, as a rear sidelight when those of the light emitting diodes 51 emit light that oppose the ringed area 16 as shown in FIG. 7, and as a brake light when those of the light emitting diodes 51 emit light that oppose the ringed area 16 and the X shaped area 15 of the disk portion 11 as shown in FIG. 8.

Figure 14:
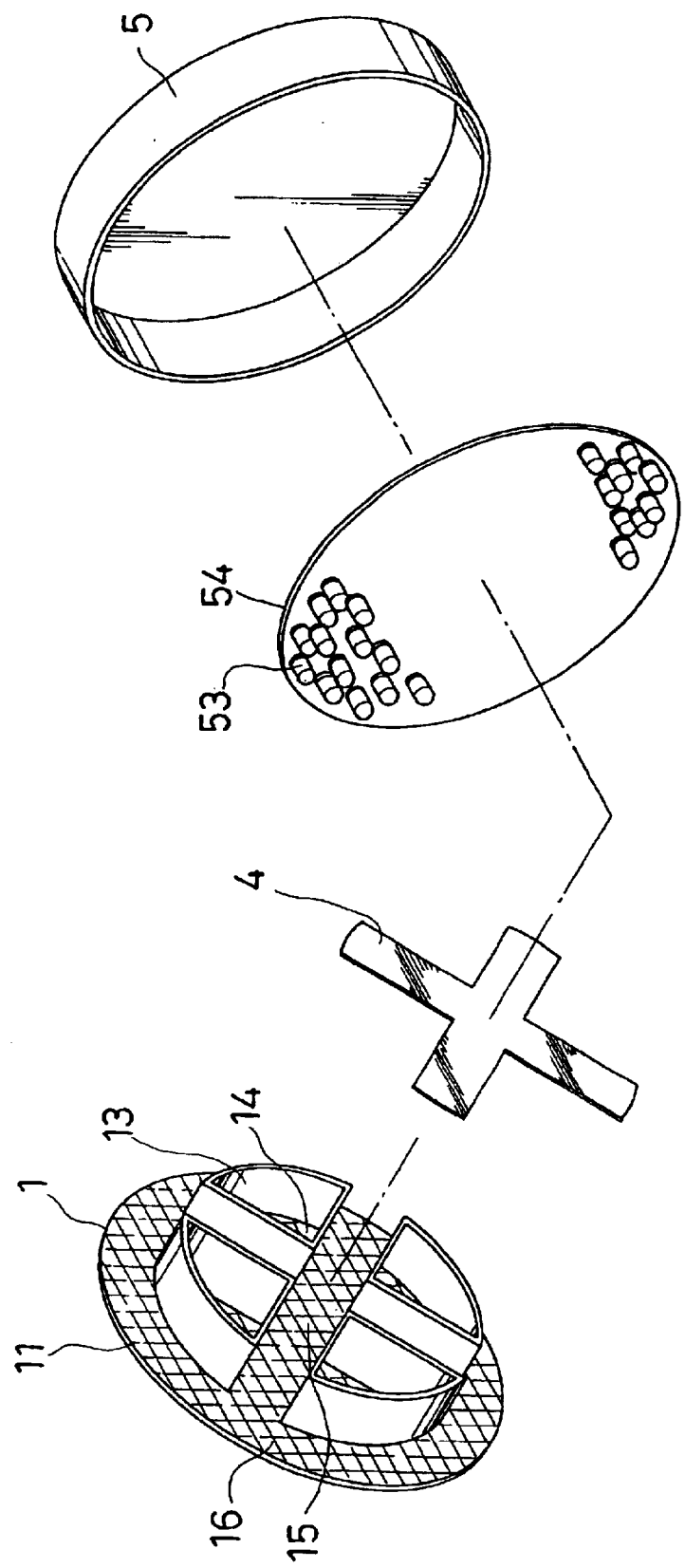
FIG. 14 is an exploded perspective view of the fourth embodiment of a tail-light of a vehicle.
Figure 15:
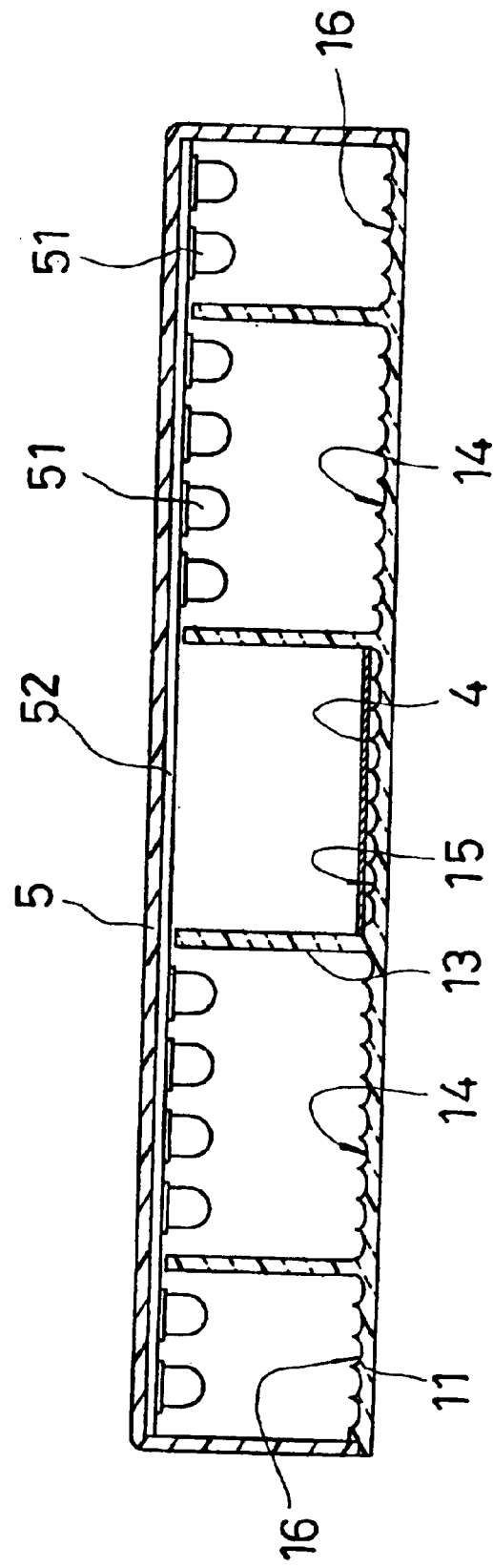
FIG. 15 is a cross-sectional view of the fourth embodiment of a tail-light.

Referring to FIGS. 14, and 15, a fourth embodiment of a tail-light of a vehicle includes a cover 1, an X shaped reflector 4, shell 5, light emitting diodes 53, and a circuit board 54. The cover 1 has disk portion 11, and separating boards 13 like the third embodiment. The X shaped reflector 4 is stuck to X shaped area 15 of the cover 1. The light emitting diodes 53 are fitted to the circuit board 54. The circuit boards 54 and the separating boards 13 are disposed in the shell 5, and the disk portion 11 is secured to the edge of the shell 5 so that the light emitting diodes 51 oppose respective ones of sector shaped areas 14 and a ringed area 16 of the disk portion 11. Thus, the fourth embodiment not only can function as turning indicator (FIG. 4), fog light (FIG. 5), back-up light (FIG. 6), and rear sidelight (FIG. 7) but also can function as a reflector when light from outside or other vehicles is shining on the cover 1, as shown in FIG. 11.

From the above description, it can be easily understood that the cover 1 of the present invention is relatively simple in the structure, and can be used together with certain different forms of shells and light emitting mechanisms of vehicle tail-light so that a vehicle tail-light can have more functions.

What is claimed is:

1. A cover for a shell of a vehicle tail-light, comprising a disk portion for covering a rear opening of a shell of a vehicle tail-light; the disk portion having an inner surface for focusing light; and a plurality of separating plates secured to an inner side of the disk portion; four sector shaped areas being defined on respective quarters of the inner side of the disk portion by the separating plates and a circle, on which outward ends of the separating plates are situated; an X shaped area being defined between the sector shaped areas on the disk portion inner side; a ringed area being defined between an edge of the disk portion and the circle on the disk portion inner side.

2. The cover for a shell of a vehicle tail-light as claimed in claim 1, wherein the inner surface of the disk portion is formed with a plurality of concavely curved portions thereon.

3. The cover for a shell of a vehicle tail-light as claimed in claim 1, wherein an X shaped reflector is adhered to the X shaped area.

4. The cover for a shell of a vehicle tail-light as claimed in claim 1, wherein additional separating plates are secured to the disk portion inner side to enclose the sector shaped areas together with the separating plates.

* * * * *